(12) United States Patent
Kapur et al.

(10) Patent No.: US 8,076,421 B2
(45) Date of Patent: Dec. 13, 2011

(54) FILM LAYERS MADE FROM POLYMER FORMULATIONS

(75) Inventors: Mridula Kapur, Lake Jackson, TX (US); David A. Eversdyk, Angleton, TX (US); Wenbin Liang, Sugar Land, TX (US); Kenneth S. Laverdure, Lake Jackson, TX (US); David T. Gillespie, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 561 days.

(21) Appl. No.: 10/590,750

(22) PCT Filed: Mar. 18, 2005

(86) PCT No.: PCT/US2005/008945
§ 371 (c)(1),
(2), (4) Date: Aug. 25, 2006

(87) PCT Pub. No.: WO2005/090464
PCT Pub. Date: Sep. 29, 2005

(65) Prior Publication Data
US 2007/0172685 A1     Jul. 26, 2007

(51) Int. Cl.
*C08L 23/00* (2006.01)
*C08L 23/04* (2006.01)
*C08L 23/08* (2006.01)
(52) U.S. Cl. ........................ 525/240; 525/191
(58) Field of Classification Search .................... 525/52, 525/53, 54, 197, 240, 191; 526/352
See application file for complete search history.

(56) References Cited

U.S. PATENT DOCUMENTS

| | | |
|---|---|---|
| 3,051,690 A | 8/1962 | Vandenberg |
| 3,257,332 A | 6/1966 | Ziegler |
| 3,456,044 A | 7/1969 | Pahlke |
| 3,485,706 A | 12/1969 | Evans |
| 3,645,992 A | 2/1972 | Elston |
| 3,741,253 A | 6/1973 | Brax et al. |
| 3,914,342 A | 10/1975 | Mitchell |
| 4,076,698 A | 2/1978 | Anderson et al. |
| 4,314,912 A | 2/1982 | Lowery, Jr. et al. |
| 4,322,027 A | 3/1982 | Reba |
| 4,340,563 A | 7/1982 | Appel et al. |
| 4,352,849 A | 10/1982 | Mueller |
| 4,413,110 A | 11/1983 | Kavesh et al. |
| 4,461,873 A * | 7/1984 | Bailey et al. ............... 525/240 |
| 4,536,550 A * | 8/1985 | Moriguchi et al. ........... 525/240 |
| 4,547,475 A | 10/1985 | Glass et al. |
| 4,551,380 A | 11/1985 | Schoenberg |
| 4,597,920 A | 7/1986 | Golike |
| 4,612,300 A | 9/1986 | Coleman, III |
| 4,659,685 A | 4/1987 | Coleman, III et al. |
| 4,663,220 A | 5/1987 | Wisneski et al. |
| 4,668,566 A | 5/1987 | Braun |
| 4,820,557 A | 4/1989 | Warren |
| 4,837,084 A | 6/1989 | Warren |
| 4,865,902 A | 9/1989 | Golike et al. |
| 4,927,708 A | 5/1990 | Herran et al. |
| 4,950,541 A * | 8/1990 | Tabor et al. .................. 428/373 |
| 4,952,451 A | 8/1990 | Mueller |
| 4,963,419 A | 10/1990 | Lustig et al. |
| 5,017,714 A | 5/1991 | Welborn, Jr. |
| 5,026,798 A | 6/1991 | Canich |
| 5,055,438 A | 10/1991 | Canich |
| 5,059,481 A | 10/1991 | Lustig et al. |
| 5,064,802 A | 11/1991 | Stevens et al. |
| 5,228,531 A | 7/1993 | Patterson et al. |
| 5,272,236 A | 12/1993 | Lai et al. |
| 5,278,272 A | 1/1994 | Lai et al. |
| 5,360,648 A | 11/1994 | Falla et al. |
| 5,364,486 A | 11/1994 | Falla et al. |
| 5,408,004 A * | 4/1995 | Lai et al. ..................... 525/240 |
| 5,494,965 A | 2/1996 | Harlin et al. |
| 5,721,025 A | 2/1998 | Falla et al. |
| 5,844,045 A | 12/1998 | Kolthammer et al. |
| 5,869,575 A | 2/1999 | Kolthammer et al. |
| 5,879,768 A | 3/1999 | Falla et al. |
| 5,942,579 A | 8/1999 | Falla et al. |
| 5,965,756 A | 10/1999 | McAdon et al. |
| 5,977,251 A | 11/1999 | Kao et al. |
| 6,034,022 A | 3/2000 | McAdon et al. |
| 6,114,486 A * | 9/2000 | Rowland et al. ............. 526/352 |
| 6,117,465 A | 9/2000 | Falla |
| 6,127,484 A | 10/2000 | Cribbs et al. |
| 6,448,341 B1 | 9/2002 | Kolthammer et al. |
| 6,538,070 B1 | 3/2003 | Cardwell et al. |
| 6,562,905 B1 | 5/2003 | Nummila-Pakarinen et al. |
| 6,566,446 B1 | 5/2003 | Parikh et al. |
| 6,689,851 B1 * | 2/2004 | Rowland et al. ............. 526/223 |
| 2003/0149180 A1 * | 8/2003 | Van Dun et al. ............. 525/240 |

FOREIGN PATENT DOCUMENTS

| | | |
|---|---|---|
| BE | 1015053 A3 | 9/2004 |
| EP | 0799274 B1 | 10/1997 |
| WO | WO-9736942 | 10/1997 |
| WO | WO-9743323 A1 * | 11/1997 |
| WO | WO-0003414 | 1/2000 |
| WO | WO-0170827 A1 | 9/2001 |
| WO | WO-02074816 | 9/2002 |
| WO | WO-2004000933 A1 | 12/2003 |

OTHER PUBLICATIONS

Williams and Ward, "The Construction of a Polyethylene Calibration Curve for Gel Permeation Chromatography Using Polystyrene Fractions," 621, Journal of Polymer Science, Polymer Letters, vol. 6 (1968).

(Continued)

*Primary Examiner* — Irina S Zemel
*Assistant Examiner* — Jeffrey Lenihan

(57) ABSTRACT

Film layers made from formulated polymer compositions are disclosed. Film layers made from such formulated compositions have surprisingly good (for example, low) water vapor transmission rates and are particularly useful for packaging dry goods such as cereal. The polymer compositions preferably have at least one homogeneous ethylene homopolymer and at least one heterogeneously branched ethylene polymer. The homogeneous ethylene homopolymer has a molecular weight much higher than that of the heterogeneously branched ethylene polymer, although the density of each is preferably higher than about 0.95 g/cm$^3$.

10 Claims, 5 Drawing Sheets

OTHER PUBLICATIONS

Bruno H. Zimm, "Apparatus and Methods for Measurement and Interpretation of the Angular Variation of Light Scattering; Preliminary Results on Polystyrene Solutions," 1099, The Journal of Chemical Physics, vol. 16, No. 12 (1948).

Pavel Kratochvil, "Fundamental Light Scattering Methods," 113-144, *Classical Light Scattering from Polymer Solutions*, New York: Elsevier, (1987).

Raymond E. Kirk, Donald F. Othmer, Martin Grayson, and David Eckroth, "Olefin Polymers (High Pressure Polyethylene)," 416-417, Kirk-Othmer Encyclopedia of Chemical Technology, 3rd ed., vol. 16, New York: John Wiley & Sons, (1981).

Raymond E. Kirk, Donald F. Othmer, Martin Grayson, and David Eckroth, "Plastics Processing," 191-192, Kirk-Othmer Encyclopedia of Chemical Technology, 3rd ed., vol. 18, New York: John Wiley & Sons, (1981).

Wilmer A. Jenkins and James P. Harrington, "Plastics and Their Fabrication," 19-27, *Packaging Food With Plastics*, Lancaster: Technomic Pub. Co., (1991).

* cited by examiner

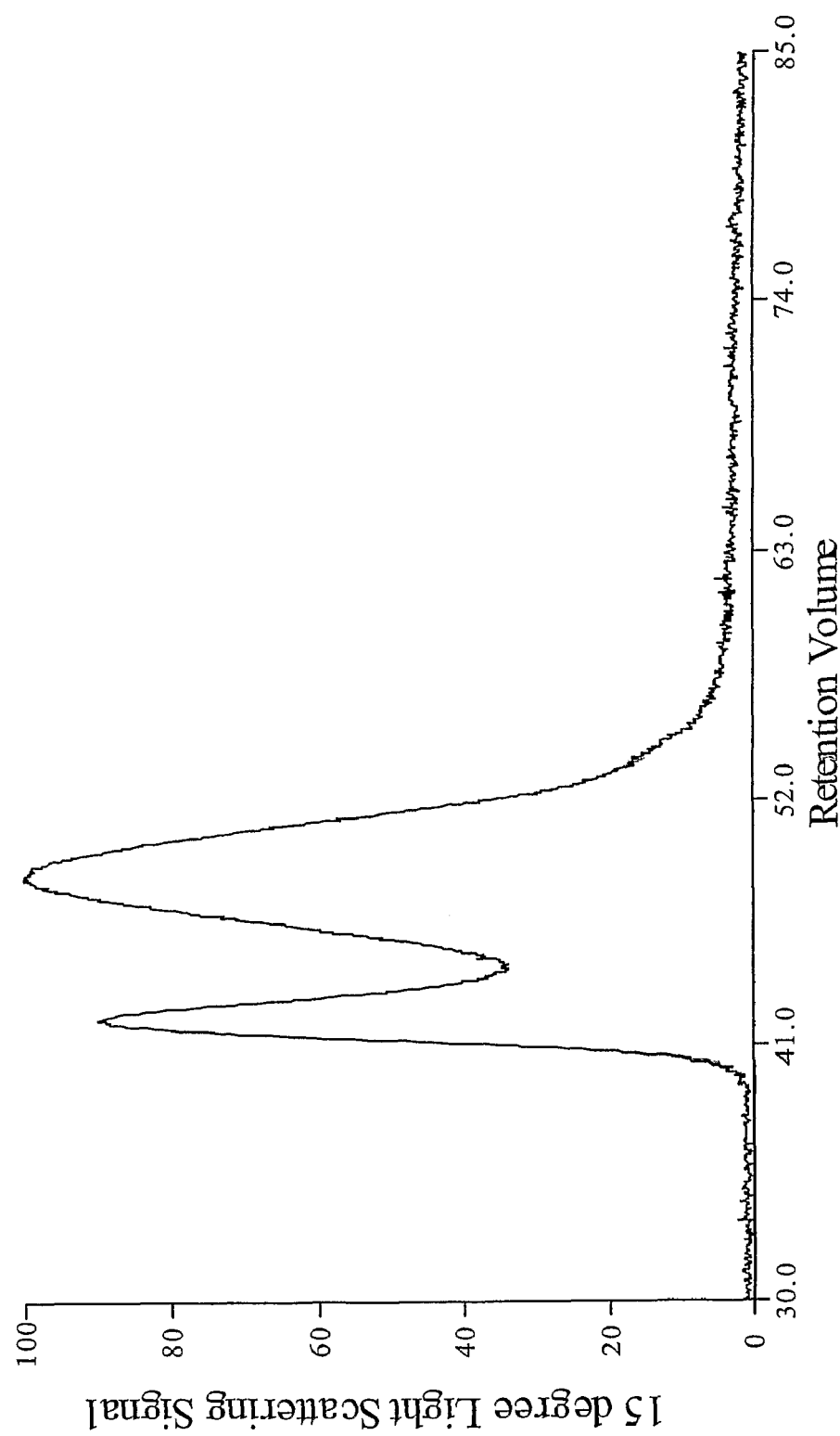

Cumulative Detector Fraction (Refractometer Detector)

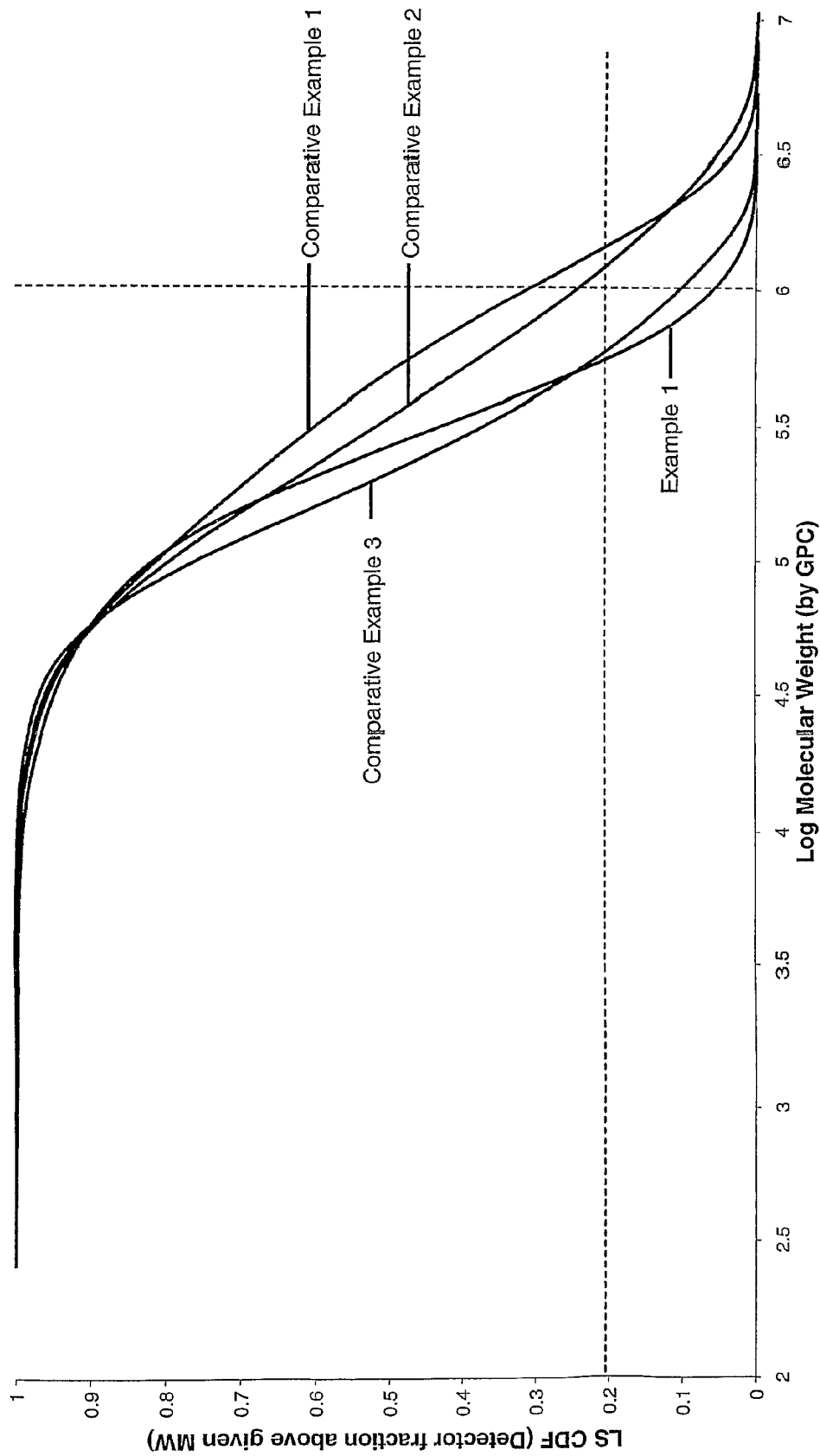

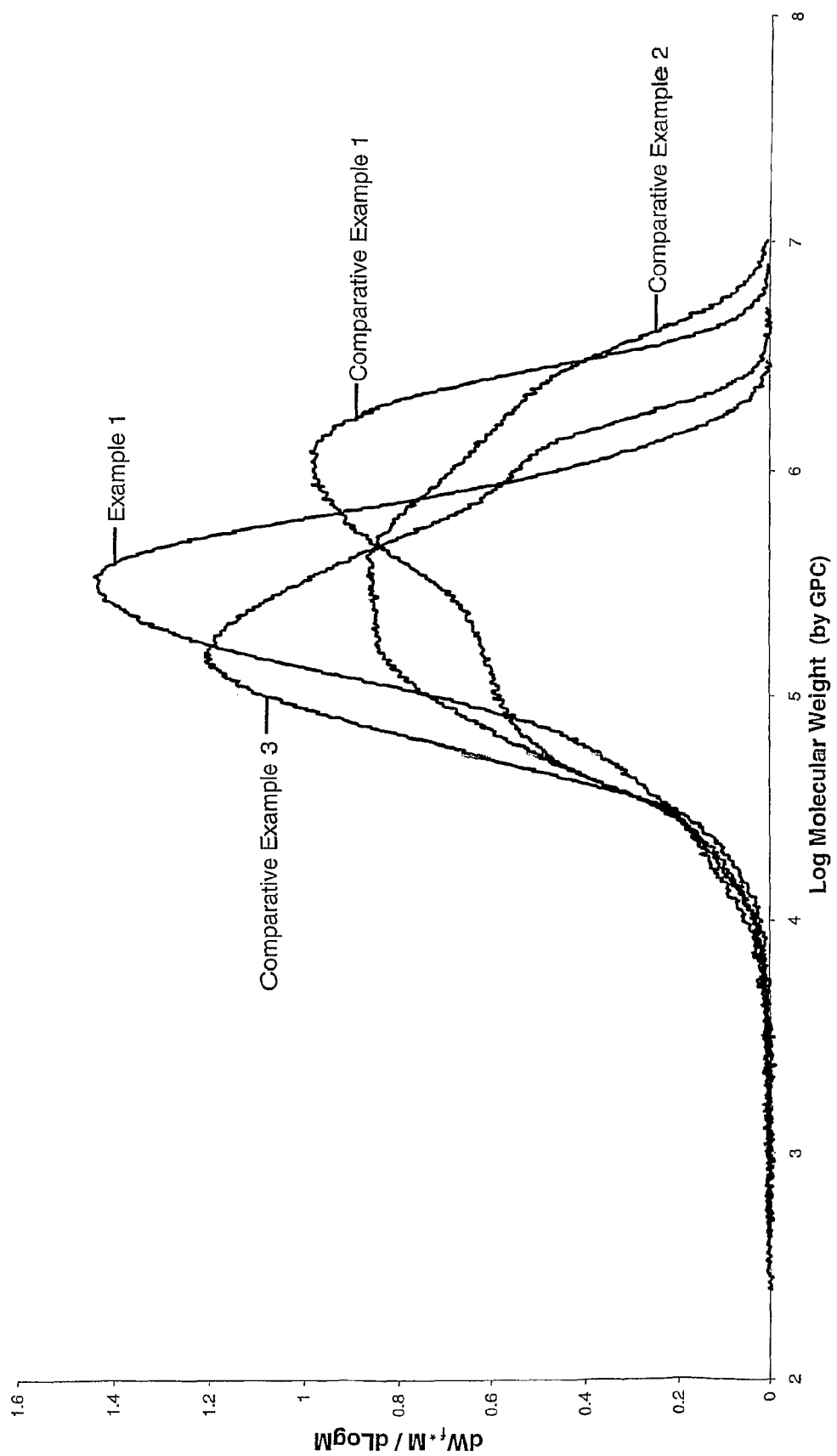

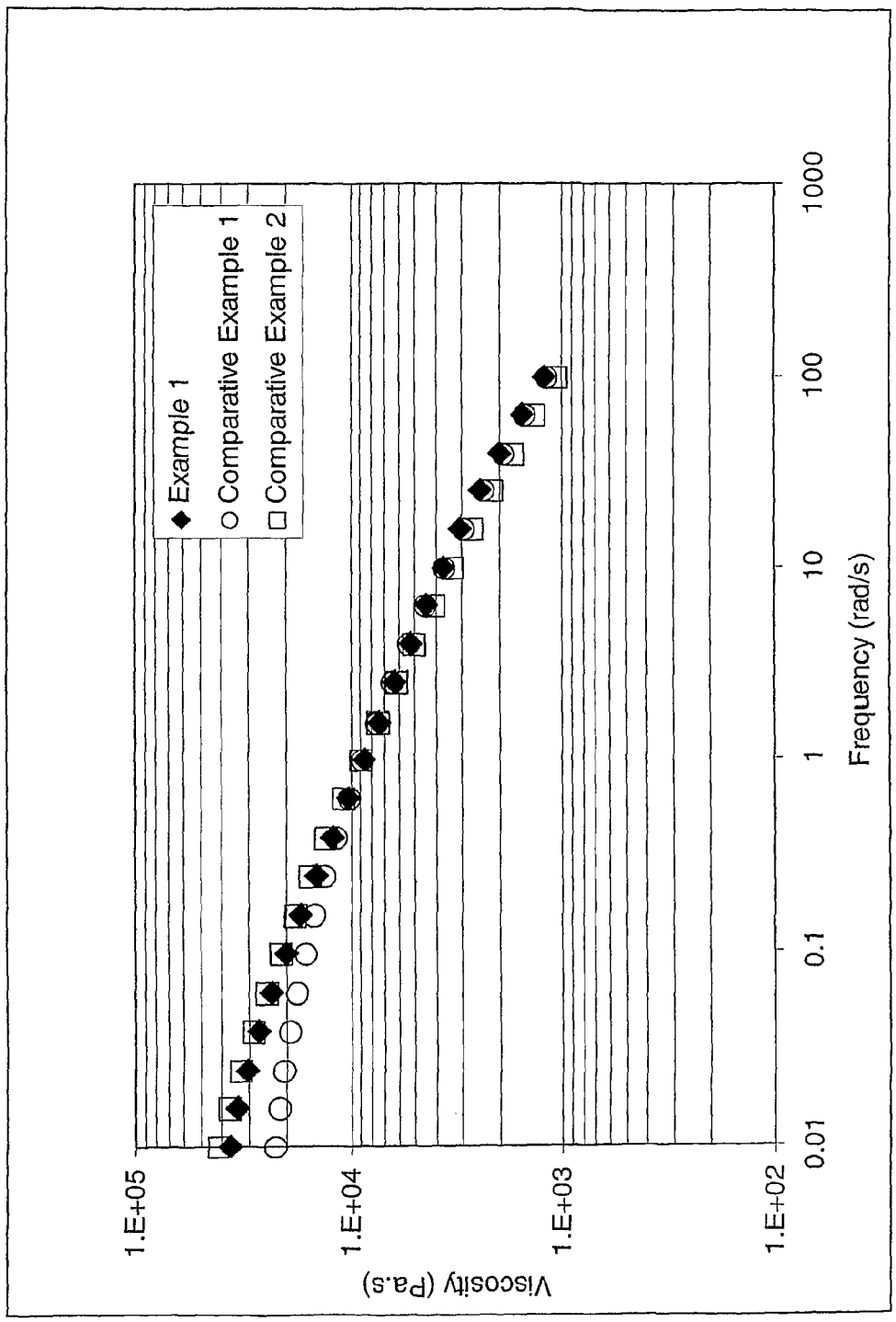

FILM LAYERS MADE FROM POLYMER FORMULATIONS

This invention relates to compositions comprising specific polymer formulations or blends. The polymer formulations or blends preferably comprise:

(A) at least one ethylene/alpha-olefin interpolymer or ethylene homoplymer having specific characteristics, blended together with (B) at least one other ethylene/alpha-olefin interpolymer or ethylene homopolymer having physical properties different from the polymer of (A).

Such compositions are particularly useful in film applications where low water vapor transmission rates are important (for example film for use in cereal liners).

For many years, the films industry has endeavored to improve water vapor transmission rates by various techniques. Some of these are described, for example, in U.S. Pat. No. 6,562,905 (Nummila-Pakarinen et al.), EP-0 799 274 B1 (Davis), and WO 01/70827 A1, the disclosures of each are incorporated heein by reference. WO 2004/000933 A1, in contrast, describes blends of polyethylene for use in films having very high water vapor transmission rates. U.S. Pat. No. 6,127,484 (Cribbs et al.), the disclosure of which is incorporated herein by reference, describes a multiple zone process to make olefin polymers using a single-site catalyst and a Ziegler-Natta catalyst; the polymers are said to be useful in making films.

Prior work in literature highlights the complex relationship between resin morphology, molecular properties, film fabrication conditions and the resulting water vapor barrier performance. Water vapor permeation in polyethylene film occurs mainly through the non-crystalline region of the polymer. Orientation of the crystalline region also has a significant effect on the permeation rate. High resin crystallinity, narrow molecular weight distribution (MWD) and low levels of long chain branching (LCB) favor low water vapor transmission rates (WVTR). These resin properties in combination with the appropriate film fabrication conditions result in a film morphology that presents a more tortuous path to permeating entities.

A blown film resin with good processability, on the other hand, requires properties such as, low melt index, broad MWD, and a high level of LCB, which are contradictory to the requirements for low WVTR.

Surprisingly, we have now discovered that film can have synergistically enhanced physical properties, especially when the film is made from a formulation of (A) at least one ethylene/alpha-olefin interpolymer or ethylene homopolymer and (B) at least one ethylene/alpha-olefin interpolymer or ethylene homopolymer, wherein (B) has physical properties different from that of (A). In the present invention a balance between good resin processability and WVTR performance was obtained by developing a bimodal, high density polyethylene resin. The resin has WVTR performance equivalent to the market leader and an improved processability as evidenced by the lower back pressure.

The compositions preferably comprise:
(A) preferably from 35 percent to 65 percent (by weight of the total composition) of at least one ethylene polymer having:
 (i) a density greater than or equal to about 0.94 grams/cubic centimeter (g/cm$^3$),
 (ii) preferably, a molecular weight distribution (Mw/Mn) from 1.5 to 53
 (iii) a melt index (I$_2$) from 0.001 grams/10 minutes (g/10 min) to 1 g/10 min; and (B) preferably from 35 percent to 65 percent (by weight of the total composition) of at least one ethylene polymer having a density greater than or equal to 0.940 g/cm$^3$, and a melt index from 50 to 700 g/10 min.

In another aspect, the invention is a film comprising at least one film layer made from a polymer composition, wherein the composition comprises (A) preferably from 35 percent to 65 percent (by weight of the total composition) of at least one ethylene polymer having:
 (i) a density greater than or equal to about 0.94 grams/cubic centimeter (g/cm$^3$),
 (ii) preferably, a molecular weight distribution (Mw/Mn) from 1.5 to 5,
 (iii) a melt index (I$_2$) from 0.001 grams/10 minutes (g/10 min) to 1 g/10 min; and (B) preferably from 35 percent (by weight of the total composition) to 65 percent (by weight of the total composition) of at least one ethylene polymer having a density greater than or equal to 0.94 g/cm$^3$, and a melt index from 50 to 700 g/10 min.

Preferably, the film layer has a water vapor transmission rate, WVTR, of less than or equal to about 0.3 g-mil/(100 in$^2$×day), more preferably less than or equal to about 0.25 g-mil/(100 in$^2$×day), and especially less than or equal to about 0.2 g-mil/(100 in$^2$×day), as measured in accordance with ASTM F 1249-90.

The composition of matter of the present invention can also be characterized according to its unique molecular architecture as evidenced by multiple detector gel permeation chromatography (GPC). When using a properly calibrated GPC, equipped with at least a low angle laser light scattering (LS) detector and a refractive index (RI) detector, the compositions of the present invention will exhibit one or preferably both of the following properties: First, the percentage fraction of a GPC-LS chromatogram which has a molecular weight equal to or greater than 1,000,000 as determined by gel permeation chromatography with a low angle laser light scattering detector, is at least 2.5 percent but less than or equal to about 20 percent, preferably equal to or less than about 15 percent, and especially equal to or less than about 10 percent, of the total area of the GPC-LS chromatogram. Second, the percentage fraction of a GPC-RI chromatogram which has a molecular weight equal to or less than about 10,000 as determined by gel permeation chromatography with a differential refractometer is equal to or greater than about 10 percent, preferably equal to or greater than about 15 percent, especially equal to or greater than about 20 percent, and less than about 25 percent of the total area of the GPC-RI chromatogram. A blown film layer comprising a composition having one or preferably both of these GPC characteristics will preferably have a water vapor transmission rate, WVTR, of less than or equal to about 0.3 g-mil/(100 in$^2$×day).

BRIEF DESCRIPTION OF THE DRAWINGS

FIG. 0 shows the gel permeation chromatography GPC LS (Light Scattering) response of NBS 1476 SRM reference sample under the described chromatography conditions.

FIG. 2 shows the GPC LS (Low Angle Laser Light. Scattering) Overlay (high molecular weight region) plotted as CDF$_{LS}$ (above GPC Mw) versus Log Molecular Weight (by GPC) for a polymer composition suitable for use in the films of this invention (Example 1), as well as competitive prior art materials.

FIG. 3 shows the GPC LS overlay for Example 1 as well as comparative prior art materials.

FIG. 4. shows the rheology comparison (viscosity vs. frequency at 190° C.) for Example 1 and comparative examples.

Definitions

Figure 1:
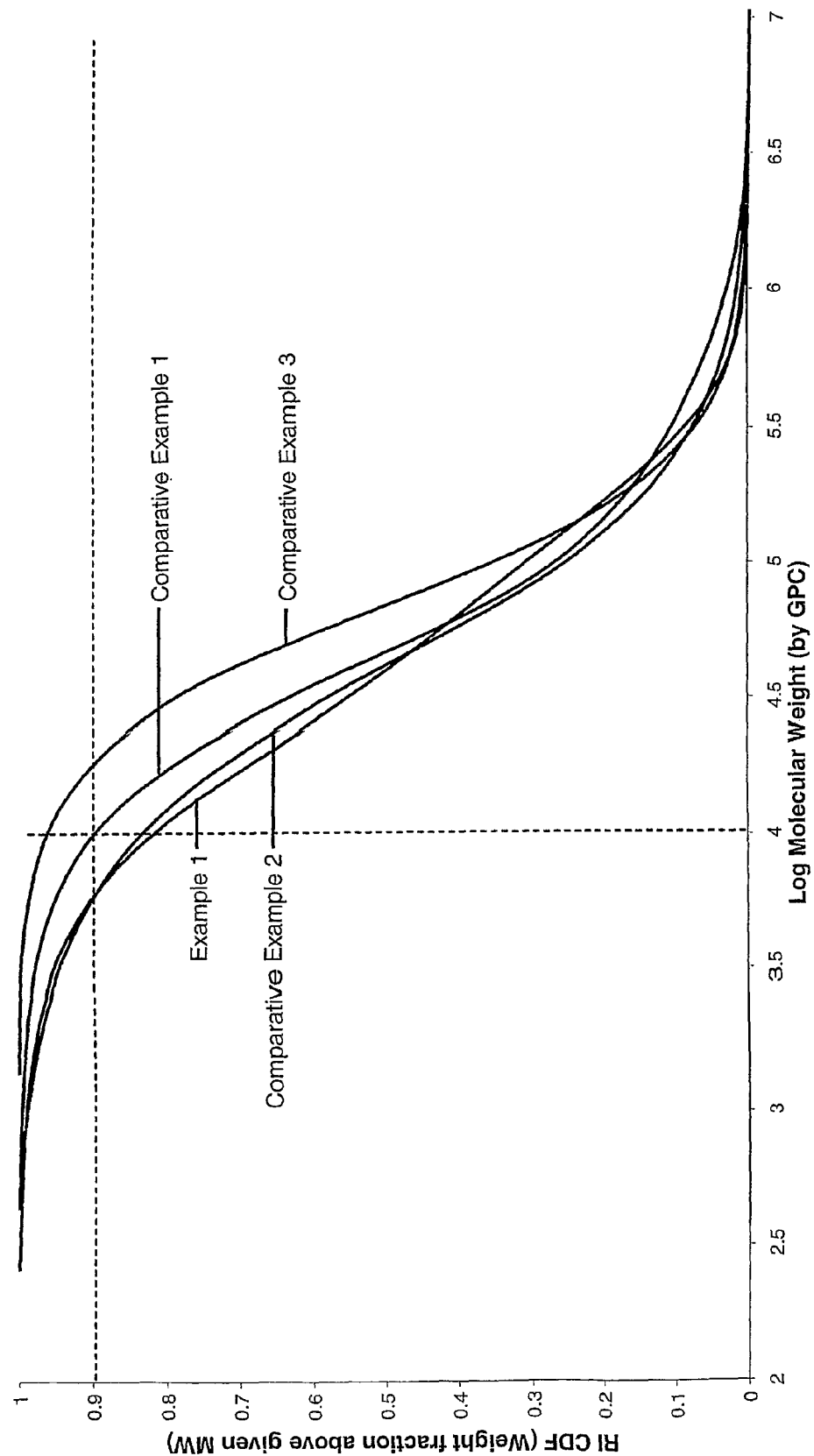
FIG. 1 shows the gel permeation chromatography (GPC) RI (Refractive Index) Overlay (low molecular weight region) plotted as CDF$_{RI}$ (above GPC Mw) versus Log Molecular Weight (by GPC) for a polymer composition suitable for use in the films of this invention (Example 1), as well as comparative prior art materials.

"Ethylene/alpha-olefin copolymer" (EAO) herein refers to copolymers of ethylene with one or more comonomers selected from $C_3$ to $C_{20}$ alpha-olefins such as propene, butene-1, hexene-1, octene-1, etc. in which the molecules of the copolymers comprise long polymer chains with relatively few side chain branches. EAO includes such heterogeneous materials as linear medium density polyethylene (LMDPE), linear low density polyethylene (LLDPE), and very low and ultra low density polyethylene (VLDPE and ULDPE), such as DOWLEX™ or ATTANE™ resins supplied by Dow, ESCORENE™ or EXCEED™ resins supplied by Exxon; as well as linear homogeneous ethylene/alpha olefin copolymers (HEAO) such as TAFMER™ resins supplied by Mitsui Petrochemical Corporation, EXACT™ resins supplied by Exxon, or long chain branched (HEAO) AFFINITY™ resins supplied by The Dow Chemical Company, or ENGAGE™ resins supplied by DuPont Dow Elastomers.

"High density polyethylene" (HDPE) herein refers to a polyethylene having a density of between 0.94 and 0.965 grams per cubic centimeter.

"LD" herein refers to the longitudinal direction, that is the direction of the film parallel to the path of extrusion. "TD" herein refers to the transverse direction, that is the direction of the film transverse to the path of extrusion.

"Linear low density polyethylene" (LLDPE) herein refers to polyethylene having a density between 0.917 and 0.925 grams per cubic centimeter.

"Linear medium density polyethylene" (LMDPE) herein refers to polyethylene having a density between 0.926 grams per cubic centimeter and 0.939 grams per cubic centimeter.

"Polyethylene" refers to a Polymer which is comprised at least in part of ethylene.

"Polymer" herein refers to homopolymer, copolymer, terpolymer, interpolymer, etc. "Copolymer" herein includes copolymer, terpolymer, etc.

All compositional percentages used herein are presented on a "by weight" basis, unless designated otherwise.

Test Methods

Density

Resin density was measured by the Archimedes displacement method, ASTM D 792-03, Method B, in isopropanol. Specimens were measured within 1 hour of molding after conditioning in the isopropanol bath at 23° C. for 8 min to achieve thermal equilibrium prior to measurement. The specimens were compression molded according to ASTM D-4703-00 Annex A with a 5 min initial heating period at about 190° C. and a 15° C./min cooling rate per Procedure C. The specimen was cooled to 45° C. in the press with continued cooling until "cool to the touch".

Melt Flow Rate by Extrusion Plastomer

Measurements were performed according to ASTM D-1238-03, Condition 190° C./2.16 kg, Condition 190° C./10.0 kg, and Condition 190° C./21.6 kg, to determine melt flow rates $I_2$, $I_{10}$, and $I_{21}$ respectively. Melt flow rate is inversely proportional to the molecular weight of the polymer. Thus, the higher the molecular weight, the lower the melt flow rate, although the relationship is not linear.

Rheology

The sample was compression molded into a disk for rheology measurement. The disks were prepared by pressing the samples into 0.06" (1.5 mm) thick plaques and were subsequently cut into 1 in (25.4 mm) disks. The compression molding procedure was as follows: 350° F. (177° C.) for 5 min at 1500 psi (1×10$^4$ kPa) under nitrogen purge; cool to ambient temperature (about 23° C.) while still under nitrogen purge.

The resin rheology was measured on the ARES I (Advanced Rheometric Expansion System) Rheometer. The ARES is a strain controlled rheometer. A rotary actuator (servomotor) applies shear deformation in the form of strain to a sample. In response, the sample generates torque, which is measured by the transducer. Strain and torque are used to calculate dynamic mechanical properties such as modulus and viscosity. The viscoelastic properties of the sample were measured in the melt using a parallel plate set up, at constant strain (5%) and temperature (190° C.), and as a function of varying frequency (0.01 to 100 rad/s). The storage modulus (G'), loss modulus (G"), tan delta, and complex viscosity (eta*) of the resin were determined using Rheometrics Orchestrator software (v. 6.5.8).

Molecular Weight

Described below in Section "Molecular Architecture Determination".

Melt Strength

Melt Strength is measured using a Goettfert Rheotens capillary rheometer to supply molten polymer at a temperature of 190° C. and at a rate of 30.26 mm$^3$/s to a die with an inside diameter of 2.1 mm, a die length of 41.9 cm, and an entrance angle of 90 degrees. The piston diameter is 9.54 mm, the piston velocity is 0.423 mm/s, the shear rate is 33 s$^{-1}$, the draw down is 100 mm. The melt is then pulled with the wheels of a Goettfert Rheotens Model 71.97 extensional rheometer with an air gap of 10 cm and an acceleration rate of 2.4 mm$^2$/s. The melt strength is the plateau value of the force in the spin line measured in centinewtons (cN), or the peak value in the case of a lack of a plateau, as is often experienced with high strength materials.

Water Vapor Transmission Rate

The film water vapor transmission rate was determined by ASTM F 1249-90

Polymer Composition

The ethylene homopolymer or interpolymer composition of the present invention comprises at least two components. One of the components is an ethylene polymer having a density of greater than or equal to about 0.94 g/cm$^3$, more preferably 0.95 g/cm$^3$, most preferably greater than about 0.958 g/cm$^3$, and a melt index (determined according to ASTM D-1238-03 Condition 190° C./2.16 kg (formerly known as "Condition (E)" and also known as $I_2$). from about 0.001, more preferably 0.005, most preferably 0.01 to about 1, more preferably 0.5 most preferably 0.1 grams/10 minutes. Preferably the first component comprises from 35 to 65 more preferably 40 to 55 most preferably 45 to 50 percent by weight of the composition. A second component of the compositions of the present invention is an ethylene polymer having a density greater than or equal to about 0.94 g/cm$^3$, more preferably 0.95 g/Cm$^3$, more preferably 0.958 g/cm$^3$, and a melt index from about 50, more preferably 65, most preferably 80 to 700, more preferably 650, most preferably 600 grams/10 minutes The second component preferably comprises from 35 to 65 percent, more preferably 45 to 60 most preferably from 50 to 55 percent by weight of the total composition.

The ethylene polymers used in the present invention may be homopolymers or interpolymers and may have homogeneous or heterogeneous branching. In general the more comonomer present in the ethylene polymers of the present invention, the greater the WVTR, and so in general homopolymer is preferred. For purposes of the present invention it is most preferred that the homopolymer contains no comonomer but may contain up to 2 weight percent comonomer, preferably no more than 1.5 weight percent and even more preferably no more than 1 weight percent comonomer.

If interpolymers are present, they may be homogeneously or heterogeneously branched. Suitable homogeneously branched interpolymers include homogeneously branched substantially linear ethylene/alpha-olefin interpolymer as described in U.S. Pat. No. 5,272,236. Homogeneously branched ethylene/alpha-olefin interpolymers can also be a linear ethylene/alpha-olefin interpolymer as described in U.S. Pat. No. 3,645,992 (Elston).

The substantially linear ethylene/alpha-olefin interpolymers discussed above are not "linear" polymers in the traditional sense of the term, as used to describe linear low density polyethylene (for example, Ziegler polymerized linear low density polyethylene (LLDPE)), nor are they highly branched polymers, as used to describe low density polyethylene (LDPE). Substantially linear ethylene/alpha-olefin interpolymers suitable for use in the present invention are herein defined as in U.S. Pat. No. 5,272,236 and in U.S. Pat. No. 5,278,272. Such substantially linear ethylene/alpha-olefin interpolymers typically are interpolymers of ethylene with at least one $C_3$-$C_{20}$ alpha-olefin and/or $C_4$-$C_{18}$ diolefins. Copolymers of ethylene and 1-octene are especially preferred.

The term "interpolymer" is used herein to indicate a copolymer, or a terpolymer, or the like. That is, at least one other comonomer is polymerized with ethylene to make the interpolymer. Ethylene copolymerized with two or more comonomers can also be used to make the homogeneously branched substantially linear interpolymers useful in this invention. Preferred comonomers include the $C_3$-$C_{20}$ alpha-olefins, especially propene, isobutylene, 1-butene, 1-hexene, 4-methyl-1-pentene, 1-heptene, 1-octene, 1-nonene, and 1-decene, more preferably 1-butene, 1-hexene, 4-methyl-1-pentene and 1-octene.

The term "linear ethylene/alpha-olefin interpolymer" means that the interpolymer does not have long chain branching. That is, the linear ethylene/alpha-olefin interpolymer has an absence of long chain branching, as for example the linear low density polyethylene polymers or linear high density polyethylene polymers made using uniform (that is, homogeneous) branching distribution polymerization processes (for example, as described in U.S. Pat. No. 3,645,992 (Elston)) and are those in which the comonomer is randomly distributed within a given interpolymer molecule and wherein substantially all of the interpolymer molecules have the same ethylene/comonomer ratio within that interpolymer. The term "linear ethylene/alpha-olefin interpolymer" does not refer to high pressure branched (free-radical polymerized) polyethylene which is known to those skilled in the art to have numerous long chain branches. The branching distribution of the homogeneously branched linear ethylene/alpha-olefin interpolymers is the same or substantially the same as that described for the homogeneously branched substantially linear ethylene/alpha-olefin interpolymers, with the exception that the linear ethylene/alpha-olefin interpolymers do not have any long chain branching. The homogeneously branched linear ethylene/alpha-olefin interpolymers comprise ethylene with at least one $C_3$-$C_{20}$ alpha-olefin and/or $C_4$-$C_{18}$ diolefin. Preferred comonomers include the $C_3$-$C_{20}$ alpha-olefins, especially propene, isobutylene, 1-butene, 1-hexene, 4-methyl-1-pentene, 1-heptene, 1-octene, 1-nonene, and 1-decene, more preferably 1-butene, 1-hexene, 4-methyl-1-pentene and 1-octene.

Both the homogeneously branched substantially linear and linear ethylene/alpha-olefin interpolymers can have a single melting point, as opposed to traditional heterogeneously branched Ziegler polymerized ethylene/alpha-olefin copolymers having two or more melting points, as determined using differential scanning calorimetry (DSC).

The density of the first polyethylene component (as measured in accordance with ASTM D-792-03) for use in the present invention is generally from 0.86 g/cm$^3$ to 0.97 g/cm$^3$, preferably greater than or equal to about 0.94 g/cm$^3$ to 0.97 g/cm$^3$, and especially greater than or equal to about 0.95 g/cm$^3$ to 0.97 g/cm$^3$.

The amount of the first component incorporated into the composition varies depending upon the second ethylene polymer to which it is combined, but is generally about 35-65 percent by weight of the final composition.

The molecular weight of the polyethylenes for use in the present invention is conveniently indicated using a melt index measurement according to ASTM D-1238-03, Condition 190° C./2.16 kg (formerly known as "Condition (E)" and also known as $I_2$). Melt index is inversely proportional to the molecular weight of the polymer. Thus, the higher the molecular weight, the lower the melt index, although the relationship is not linear.

The melt index limit for the overall ethylene polymer compositions is as high as about 10 g/10 min, preferably about 5 g/10 min, more preferably about 1 g/10 min, and can be as low as 0.001 g/10 min, preferably as low as 0.01 g/10 min, more preferably as low as about 0.1 g/10 min.

Another measurement useful in characterizing the molecular weight of the polyethylenes is conveniently indicated using a melt flow rate measurement according to ASTM D-1238-03, Condition 190° C./10 kg (formerly known as "Condition (N)" and also known as $I_{10}$). The ratio of the $I_{10}$ and $I_2$ terms is referred to as the melt flow ratio and is designated as $I_{10}/I_2$. Generally, the $I_{10}/I_2$ ratio for the homogeneously branched linear ethylene/alpha-olefin interpolymers which may be used in the present invention is about 5.6.

For the homogeneously branched substantially linear ethylene/alpha-olefin interpolymers and ethylene homopolymers which may be used in the compositions of the invention, the $I_{10}/I_2$ ratio indicates the degree of long chain branching, that is, the higher the $I_{10}/I_2$ ratio, the more long chain branching in the interpolymer. Generally, the $I_{10}/I_2$ ratio of the homogeneously branched substantially linear ethylene/alpha-olefin interpolymers is at least 6, preferably at least 7, especially at least 8 or above. For the homogeneously branched substantially linear ethylene/alpha-olefin interpolymers, the higher the $I_{10}/I_2$ ratio, the better the processability.

Other additives such as antioxidants (for example, hindered phenolics (e.g., Irganox 1010 made by Ciba Geigy Corp.), phosphites (for example, Irgafos 168 also made by Ciba Geigy Corp.)), cling additives (for example, PIB), anti-block additives; pigments, fillers, can also be included in the formulations, to the extent that they do not interfere with the enhanced formulation properties discovered by Applicants.

Molecular Architecture Determination

The preferred polyethylene composition of the present invention can also be characterized as having a percentage fraction of a GPC-LS chromatogram which has a molecular weight equal to or greater than 1,000,000 as determined by gel permeation chromatography with a low angle laser light scattering detector is at least about 2.5 percent but no more than about 20 percent, more preferably no more than about 15 percent, even more preferably no more than about 10 percent of the total area of the GPC-LS chromatogram. The ethylene homopolymer or interpolymer composition of the present invention can also be characterized as having a percentage fraction of a GPC-RI chromatogram which has a molecular weight equal to or less than about 10,000 as determined by gel permeation chromatography with a differential refractometer is equal to or greater than about 10 percent, more preferably 15 percent, even more preferably 20 percent and preferably no more than about 25 percent of the total area of the GPC-RI chromatogram.

In order to determine the molecular architecture of various polymer compositions, the following procedure was used:

The chromatographic system consisted of a Waters (Millford, Mass.) 150 C high temperature chromatograph equipped with a Precision Detectors (Amherst, Mass.) 2-angle laser light scattering detector Model 2040. The 15-degree angle of the light scattering detector was used for the calculation of molecular weights. Data collection was performed using Viscotek TriSEC software version 3 and a 4-channel Viscotek Data Manager DM400. The system was equipped with an on-line solvent degas device from Polymer Laboratories.

The carousel compartment was operated at 140° C. and the column compartment was operated at 150° C. The columns used were 4 Shodex HT 806M 13-micron columns. The solvent used was 1,2,4 trichlorobenzene. The samples were prepared at a concentration of 0.1 grams of polymer in 50 milliliters of solvent. The chromatographic solvent and the sample preparation solvent contained 200 ppm of butylated hydroxytoluene (BHT). Both solvent sources were nitrogen sparged. Polyethylene samples were stirred gently at 160 degrees Celsius for 4 hours. The injection volume used was 200 microliters and the flow rate was 0.63 milliliters/minute.

Calibration of the GPC column set was performed With a minimum of 15 narrow molecular weight distribution polystyrene standards with molecular weights ranging from 580 to 8,400,000 and were arranged in 6 "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The narrow standards mixtures were run first and in order of decreasing highest molecular weight component to minimize degradation. The polystyrene standard peak molecular weights were converted to polyethylene molecular weights using the Equation 1 (as described in Williams and Ward, J. Polym. Sci., Polym. Let., 6, 621 (1968)):

$$\text{Mpolyethylene} = A \times (\text{Mpolystyrene})^B \quad \text{Equation 1}$$

Where M is the molecular weight, A has a value of 0.4315 and b is equal to 1.0.

A fourth order polynomial was used to fit the respective polyethylene-equivalent calibration points.

The total plate count of the GPC column set was performed with Eicosane (prepared at 0.04 g in 50 milliliters of TCB and dissolved for 20 minutes with gentle agitation.) The plate count and symmetry were measured on a 200 microliter injection according to Equations 2 and 3:

$$\text{PlateCount} = 5.54 * (RV_{at\ Peak\ Maximum}/(\text{Peak width}_{at\ 1/2\ height}))^2 \quad \text{Equation 2}$$

Where RV is the retention volume in milliliters and the peak width is in milliliters.

$$\text{Symmetry} = (\text{Rear peak width}_{at\ 1/10\ height} - RV_{at\ Peak\ maximum})/(RV_{at\ Peak\ Maximum} - \text{Front peak width}_{at\ 1/10\ height}) \quad \text{Equation 3}$$

Where RV is the retention volume in milliliters and the peak width is in milliliters.

The Systematic Approach for the determination of multidetector offsets was done in a manner consistent with that published by Balke, Mourey, et. Al (Mourey and Balke, Chromatography Polym. Chpt 12, (1992)) (Balke, Thitiratsakul, Lew, Cheung, Mourey, Chromatography Polym. Chpt 13, (1992)), optimizing dual detector log results from Dow broad polystyrene 1683 to the narrow standard column calibration results from the narrow standards calibration curve using in-house software. The molecular weight data for off-set determination was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration used for the determination of the molecular weight was obtained from the sample refractive index area and the refractive index detector calibration from a linear polyethylene homopolymer of 115,000 molecular weight. The chromatographic concentrations were assumed low enough to eliminate addressing 2nd Virial coefficient effects (concentration effects on molecular weight).

In order to monitor the deviations over time, which may contain an elution component (caused by chromatographic changes) and a flowrate component (caused by pump changes), a late eluting narrow peak is generally used as a "marker peak". A flowrate marker was therefore established based on the air peak mismatch between the degassed chromatographic system solvent and the elution sample on one of the polystyrene cocktail mixtures. This flowrate marker was used to linearly correct the flowrate for all samples by alignment of the air peaks. Any changes in the time of the marker peak are then assumed to be related to a linear shift in both flowrate and chromatographic slope.

To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (as a measurement of the calibration slope) is calculated as Equation 4. In a high-temperature SEC system, an antioxidant mismatch peak or an air peak (if the mobile phase is sufficiently degassed) can be used as an effective flow marker. The primary features of an effective flowrate marker are as follows: the flow marker should be mono-dispersed. The flow marker should elute close to the total column permeation volume. The flow marker should not interfere with the chromatographic integration window of the sample.

$$\text{Flowrate}_{effective} = \text{Flowrate}_{nominal} \times \text{FlowMarker}_{calibration}/\text{Flowmarker}_{Observed} \quad \text{Equation 4}$$

The preferred column set is of 13 micron particle size and "mixed" porosity to adequately separate the highest molecular weight fractions appropriate to the claims.

The verification of adequate column separation and appropriate shear rate can be made by viewing the low angle (less than 20 degrees) of the on-line light scattering detector on an NBS 1476 high pressure low density polyethylene standard. The appropriate light scattering chromatogram should appear bimodal (very high MW peak and moderate molecular weight peak) with approximately equivalent peak heights as shown in the FIG. 0. There should be adequate separation by demonstrating a trough height between the two peaks less than half of the total LS peak height. The plate count for the chromatographic system (based on eicosane as discussed previously) should be greater than 32,000 and symmetry should be between 1.00 and 1.12.

The calculation of the cumulative detector fractions (CDF) for the refractometer ("CDF RI") and the low angle laser light scattering detector ("CDF LS") are accomplished by the following steps:

1) Linearly flow correct the chromatogram based on the relative retention volume ratio of the air peak between the sample and that of a consistent narrow standards cocktail mixture.

2) Correct the light scattering detector offset relative to the refractometer as described in the calibration section.

3) Subtract baselines from the light scattering and refractometer chromatograms and set integration windows making certain to integrate all of the low molecular weight retention volume range in the light scattering chromatogram that is observable from the refractometer chromatogram.

4) Calculate the molecular weights at each data slice based on the polystyrene calibration curve, modified by the polystyrene to polyethylene conversion factor (0.4315) as described in the calibration section.

5) Calculate the cumulative detector fraction (CDF) of each chromatogram ($CDF_{RI}$ and $CDF_{LS}$) based on its baseline-subtracted peak height (H) from high to low molecular weight (low to high retention volume) at each data slice (i) according to the Equation 5:

$$CDF_i = \frac{\sum_{j=LowestRVindex}^{i} H_j}{\sum_{j=LowestRVindex}^{HighestRVindex} H_j}.$$  Equation 5 where i is between the LowestRVindex and the HighestRVindex

6) A plot of CDF versus molecular weight is obtained by calculating the CDF at each integrated data slice from step (5) and plotting it versus the log of the polyethylene equivalent molecular weight at each integrated data slice from step (4).

Using this GPC method, an analysis was done on the following resins: a commercially available comparative example 2, and example 1 of the invention. The plots for these materials are shown in FIGS. 1 and 2. These figures also indicate the log of 10,000 MW for the $CDF_{RI}$ plot, and the log of 1,000,000 MW for $CDF_{LS}$ plot. From these lines it can clearly be seen that none of the comparative examples meet both the $CDF_{LS}$ criteria for the present invention and the $CDF_{RI}$ criteria for the present invention.

As known by a person of ordinary skill in the art, the chromatographic moments representing the number-average molecular weight of the distribution can be calculated from the polyethylene-equivalent calibration curve where the weight fraction is obtained from the normalization of the refractometer height as a function of the volume slice (i) as shown in Equation 6.

$$\overline{Mn} = \frac{\sum^i W f_i}{\sum^i (W f_i / M_i)}$$  Equation 6

For the Mw and Mz calculations, the molecular weight can be obtained from absolute light scattering measurements using equations 7 and 8.

$$\overline{Mw} = \frac{\sum^i (W f_i * M_i)}{\sum^i W f_i}$$  Equation 7

$$\overline{Mz} = \frac{\sum^i (W f_i * M_i^2)}{\sum^i (W f_i * M_i)}$$  Equation 8

The Heterogeneously Branched Ethylene Polymer

Preferably, the ethylene polymer to be combined with the first component is an ethylene homopolymer, but could also be a heterogeneously branched (for example, Ziegler-Natta polymerized) interpolymer of ethylene with at least one $C_3$-$C_{20}$ alpha-olefin (for example, linear low density polyethylene (LLDPE)). For ethylene homopolymer, the density is typically about 0.97 g/cubic centimeter, but the measured density can be slightly lower, for example, greater than or equal to about 0.94 g/cm³ for very high molecular weight ethylene homopolymers, such as the molecular weights required for component (A) of the invention (melt indices from 0.001 to 1 g/10 min).

Heterogeneously branched ethylene/alpha-olefin interpolymers differ from the homogeneously branched ethylene/alpha-olefin interpolymers primarily in their branching distribution. For example, heterogeneously branched LLDPE polymers have a distribution of branching, including a highly branched portion (similar to a very low density polyethylene), a medium branched portion (similar to a medium branched polyethylene) and an essentially linear portion (similar to linear homopolymer polyethylene). Such manufacturing techniques for making the heterogeneously branched ethylene polymer is taught in U.S. Pat. No. 3,914,342 (Mitchell) and U.S. Pat. No. 4,076,698 (Anderson et al).

Examples of catalyst suitable for preparing the heterogeneous component are described in U.S. Pat. Nos. 4,314,912 (Lowery et al.), U.S. Pat. No. 4,547,475 (Glass et al.), U.S. Pat. No. 4,076,698 (Anderson), and U.S. Pat. No. 4,612,300 (Coleman, III); examples of catalyst suitable for producing the homogeneous component are described in U.S. Pat. Nos. 5,026,798 and 5,055,438 (Canich); 3,645,992 (Elston); 5,017,714 (Welborn); and 5,064,802 (Stevens et al.).

The amount of each of these fractions varies depending upon the whole polymer properties desired. For example, linear homopolymer polyethylene has neither branched nor highly branched fractions, but is linear. A very low density heterogeneous polyethylene having a density from 0.9 g/cm³ to 0.915 g/cm³ (such as ATTANE™ copolymers, sold by The Dow Chemical Company and FLEXOMER™ sold by Union Carbide Corporation) has a higher percentage of the highly short chain branched fraction, thus lowering the density of the whole polymer.

Heterogeneously branched LLDPE (such as DOWLEX™ sold by The Dow Chemical Company) has a lower amount of the highly branched fraction, but has a greater amount of the medium branched fraction.

The Formulated Compositions

The compositions disclosed herein can be formed by any convenient method, including dry blending the individual components and subsequently melt mixing or by pre-melt mixing in a separate extruder (e.g., a Banbury mixer, a Haake mixer, a Brabender internal mixer, or a twin screw extruder).

U.S. Pat. No. 5,844,045, U.S. Pat. No. 5,869,575 and U.S. Pat. No. 6,448,341 describes, inter alia, interpolymerizations of ethylene and, optionally, $C_3$-$C_{20}$ alpha-olefins, using a homogeneous catalyst in at least one reactor and a heterogeneous catalyst in at least one other reactor. U.S. Pat. Nos. 6,566,446 (Parikh et al.) and 6,538,070 (Cardwell et al.) disclose ethylene interpolymerizations using a homogeneous catalyst in two different reactors, where the polymerization conditions vary so as to affect the reactivity of the catalysts. In any case, the reactors can be operated sequentially or in parallel. In any case, the catalyst components (which may include activators, modifiers, and cocatalysts) can be injected very close to each other, for example, each injection point is within two linear feet of every other catalyst component injection point, (but not necessarily pre-mixed) in the same reactor.

The compositions can also be made by fractionating a heterogeneous ethylene/alpha-olefin polymer into specific polymer fractions with each fraction having a narrow composition (that is, branching) distribution, selecting the fraction having the specified properties, and blending the selected fraction in the appropriate amounts with another ethylene polymer. This method is obviously not as economical as the in-situ interpolymerizations of U.S. Pat. No. 5,844,045, U.S. Pat. No. 5,869,575, U.S. Patent No. 6,566,446, U.S. Pat. No. 6,538,070, and U.S. Pat. No. 6,448,341, but can be used to obtain the compositions of the invention.

There are a variety of ways to make these types of polymers, and include slurry, solution and gas phase polymerizations, especially preferred is the solution process. Various patents disclose polymerization techniques, including U.S. Pat. No. 4,076,698 (Andersen et al.), U.S. Pat. No. 5,977,251 (Kao et al.) and WO 97/36942 (Kao et al.), the disclosures of each of which is incorporated herein by reference in their entirety. By "solution" process it is meant that the polymer, typically 10-30 percent by weight of the solution, but which can be as high as 30-50 percent by weight of the solution, and unconverted monomer(s) are substantially dissolved in the solvent; althought it should be understood that solids and gases (including undissolved monomer) may be present in this "solution" without resulting in substantial gel production, and in fact minimizing gel formation. Sometimes, the support for the catalyst is inert and not soluble in the solution, but is suspended in the "solution." Unsupported catalysts, however, can be soluble in the solution and become part of the liquid phase. However, the "solution" is substantially in a liquid phase. Another solution process is described in U.S. Pat. No. 3,914,342 (Mitchell).

Fabricated Articles Made from the Novel Compositions

Many useful fabricated articles benefit from the novel compositions disclosed herein. For example, molding operations can be used to form useful fabricated articles or parts from the compositions disclosed herein, including various injection molding processes (for example, that described in Modern Plastics Encyclopedia/89, Mid October 1988 Issue, Volume 65, Number 11, pp. 264-268, "Introduction to Injection Molding" by H. Randall Parker and on pp. 270-271, "Injection Molding Thermoplastics" by Michael W. Green, and blow molding processes (for example, that described in Modern Plastics Encyclopedia/89, Mid October 1988 Issue, Volume 65, Number 11, pp. 217-218; "Extrusion-Blow Molding" by Christopher Irwin, profile extrusion, calandering, pultrusion (for example, pipes). Rotomolded articles can also benefit from the novel compositions described herein. Rotomolding techniques are well known to those skilled in the art and include, for example, those described in Modern Plastics Encyclopedia/89, Mid October 1988 Issue, Volume 65, Number 11, pp. 296-301, "Rotational Molding" by R. L. Fair.

Fibers (for example, staple fibers, melt blown fibers or spunbonded fibers (using, for example, systems as disclosed in U.S. Pat. Nos. 4,340,563, 4,663,220, 4,668,566, or 4,322,027, and gel spun fibers (for example, the system disclosed in U.S. Pat. No. 4,413,110), both woven and nonwoven fabrics (for example, spunlaced fabrics disclosed in U.S. Pat. No. 3,485,706, or structures made from such fibers (including, for example, blends of these fibers with other fibers, for example, PET or cotton)) can also be made from the novel compositions disclosed herein.

Film and film structures particularly benefit from the novel compositions described herein and can be made using conventional hot blown film fabrication techniques or other biaxial orientation processes such as tenter frames or double bubble processes. A blown film layer comprising the composition preferably has a water vapor transmission rate, WVTR, of less than or equal to about 0.3 g-mil/(100 in$^2$×day), as measured in accordance with ASTM F 1249-90.

Conventional hot blown film processes are described, for example, in The Encyclopedia of Chemical Technology, Kirk-Othmer, Third Edition, John Wiley & Sons, New York, 1981, Vol. 16, pp. 416-417 and Vol. 18, pp. 191-192. Biaxial orientation film manufacturing process such as described in a "double bubble" process as in U.S. Pat. No. 3,456,044 (Pahlke), and the processes described in U.S. Pat. No. 4,352,849 (Mueller), U.S. Pat. No. 4,597,920 (Golike), U.S. Pat. No. 4,820,557 (Warren), U.S. Pat. No. 4,837,084 (Warren), U.S. Pat. No. 4,865,902 (Golike et al.), U.S. Pat. No. 4,927,708 (Herran et al.), U.S. Pat. No. 4,952,451 (Mueller), U.S. Pat. No. 4,963,419 (Lustig et al.), and U.S. Pat. No. 5,059,481 (Lustig et al.), can also be used to make film structures from the novel compositions described herein. The film structures can also be made as described in a tenter-frame technique, such as that used for oriented polypropylene.

Other multi-layer film manufacturing techniques for food packaging applications are described in Packaging Foods With Plastics, by Wilmer A. Jenkins and James P. Harrington (1991), pp. 19-27, and in "Coextrusion Basics" by Thomas I. Butler, Film Extrusion Manual: Process, Materials, Properties pp. 31-80 published by TAPPI Press (1992)).

The films may be monolayer or multilayer films. The film made from the novel compositions can also be coextruded with the other layer(s) or the film can be laminated onto another layer(s) in a secondary operation, such as that described in Packaging Foods With Plastics, by Wilmer A. Jenkins and James P. Harrington (1991) or that described in "Coextrusion For Barrier Packaging" by W. J. Schrenk and C. R. Finch, Society of Plastics Engineers RETEC Proceedings, Jun. 15-17 (1981), pp. 211-229. If a monolayer film is produced via tubular film (that is, blown film techniques) or flat die (that is, cast film) as described by K. R. Osborn and W. A. Jenkins in "Plastic Films, Technology and Packaging Applications" (Technomic Publishing Co., Inc. (1992)), then the film must go through an additional post-extrusion step of adhesive or extrusion lamination to other packaging material layers to form a multilayer structure. If the film is a coextrusion of two or more layers (also described by Osborn and Jenkins), the film may still be laminated to additional layers of packaging materials, depending on the other physical requirements of the final film.

"Laminations Vs. Coextrusion" by D. Dumbleton (Converting Magazine (September 1992)), also discusses lamination versus coextrusion. Monolayer and coextruded films can also go through other post extrusion techniques, such as a biaxial orientation process.

Extrusion coating is yet another technique for producing multilayer film structures using the novel compositions described herein. The novel compositions comprise at least one layer of the film structure. Similar to cast film, extrusion coating is a flat die technique. A sealant can be extrusion coated onto a substrate either in the form of a monolayer or a coextruded extrudate.

The films and film layers of this invention are especially useful in vertical-form-fill-seal (VFFS) applications. Patents describing improvements for VFFS applications, especially polymer improvements, include U.S. Pat. No. 5,228,531; U.S. Pat. No. 5,360,648; U.S. Pat. No. 5,364,486; U.S. Pat. No. 5,721,025; U.S. Pat. No. 5,879,768; U.S. Pat. No. 5,942,579; U.S. Pat. No. 6,117,465.

The films and film layers of this invention are also useful as grease barriers such as food packaging applications (for example, dog food packaging).

Generally for a multilayer film structure, the novel compositions described herein comprise at least one layer of the total multilayer film structure. Other layers of the multilayer structure include but are not limited to barrier layers, and/or tie layers, and/or structural layers.

Various materials can be used for these layers, with some of them being used as more than one layer in the same film structure. Some of these materials include: foil, nylon, ethylene/vinyl alcohol (EVOH) copolymers, polyvinylidene chloride (PVDC), polyethylene terephthalate (PET), polypropylene, oriented polypropylene (OPP), ethylene/vinyl acetate (EVA) copolymers, ethylene/acrylic acid (EAA) copolymers, ethylene/methacrylic acid (EMAA) copolymers, LLDPE, HDPE, LDPE, nylon, graft adhesive polymers (for example, maleic anhydride grafted polyethylene), and paper. Generally, the multilayer film structures comprise from 2 to 7 layers.

Film can be made by cast extrusion (for monolayer films) or coextrusion (for multilayer films) by techniques well known in the art. The films can be quenched, irradiated by electron beam irradiation at a dosage of between 20 and 35 kiloGrays, and reheated to their orientation temperature, and then stretched at a ratio of 5:1 in each of the longitudinal and transverse directions.

Film of the present invention can be made by any suitable process, including coextrusion, lamination, extrusion coating, or corona bonding and are preferably made by tubular cast coextrusion, such as that shown in U.S. Pat. No. 4,551,380 (Schoenberg). Bags made from the film can be made by any suitable process, such as that shown in U.S. Pat. No. 3,741,253 (Brax et al.). Side or end sealed bags can be made from single wound or double wound films.

Film of the present invention can be oriented by any suitable process, including a trapped bubble process or a simultaneous or sequential tenterframe process.

Film of the present invention can have any total thickness desired, so long as the film provides the desired properties for the particular packaging operation in which the films is used. Final film thicknesses can vary, depending on process, end use application, etc. Typical thicknesses range from 0.1 to 20 mils, preferably 0.2 to 15 mils, more preferably 0.3 to 10 mils, more preferably 0.3 to 5 mils, more preferably 0.3 to 2 mils, such as 0.3 to 1 mil.

Film of the present invention can have a tear propagation (ASTM 1938) of between 3 and 10 grams in either or both of the longitudinal and transverse directions.

Film of the present invention can have a haze value of between 0.1 and 5, more preferably between 0.1 and 4.5, more preferably between 0.1 and 4, more preferably between 0.1 and 3.5, more preferably between 0.1 and 3.5, more preferably between 0.1 and 3, more preferably between 0.1 and 2.5, and most preferably between 0.1 and 2. Film of the invention can have a haze value of 5 or less than 5, 4 or less than 4, 3.5 or less than 3.5, 3 or less than 3, 2.5 or less than 2.5, 2 or less than 2, or 1 or less than 1.

The multilayer film of the present invention can have a peak load/mil value (ASTM D3763-95a) of at least 155, more preferably at least 160, more preferably at least 165, more preferably at least 167, more preferably at least 170, more preferably at least 170, more preferably at least 175, more preferably at least 180, more preferably at least 185, more preferably at least 190, and most preferably at least 195 newtons/mil. Preferred ranges for peak load/mil are between 155 and 400, more preferably between 155 and 390, more preferably between 160 and 380, more preferably between 165 and 370, more preferably between 167 and 360, more preferably between 170 and 350, more preferably between 175 and 340, more preferably between 180 and 330, more preferably between 185 and 320, more preferably between 190 and 310, and most preferably between 195 and 300 newtons/mil.

The polymeric components used to fabricate film according to the present invention can also contain appropriate amounts of other additives normally included in such compositions. These include slip agents, antioxidants, fillers, dyes, pigments, radiation stabilizers, antistatic agents, elastomers, and other additives known to those of skill in the art of packaging films.

The multilayer film of the present invention can have an energy to break/mil value (ASTM D3763-95a) of at least 1.28, more preferably at least 1.30, more preferably at least 1.35, more preferably at least 1.40, more preferably at least 1.45, more preferably at least 1.50, more preferably at least 1.55, more preferably at least 1.58, more preferably at least 1.60, more preferably at least 1.65, more preferably at least 1.70, more preferably at least 1.75, more preferably at least 1.80, more preferably at least 1.85, and most preferably at least 1.90 Joules/mil. Preferred ranges for energy to break per mil are between 1.28 and 4.00, preferably between 1.30 and 3.00, more preferably between 1.35 and 3.00, more preferably between 1.40 and 2.90, more preferably between 1.45 and 2.85, more preferably between 1.50 and 2.85, more preferably between 1.55 and 2.80, more preferably between 1.60 and 2.75, more preferably between 1.65 and 2.75, more preferably between 1.70 and 2.75, more preferably between 1.75 and 2.75, and most preferably between 1.80 and 2.50 Joules/mil.

The multilayer films of the present invention can exhibit a tensile strength (ASTM D 882-95) of preferably at least 18,000, more preferably at least 19,000, more preferably at least 20,000, more preferably at least 21,000, more preferably at least 21,500, more preferably at least 22,000, more preferably at least 22,500, and most preferably at least 23,000 psi in either or both of the longitudinal and transverse directions, and preferably in both the longitudinal and transverse directions. Preferred ranges for tensile strength are between 18,060 to 200,000, and more preferably between 23,000 and 100,000 psi in either or both of the longitudinal and transverse directions, and preferably in both the longitudinal and transverse directions.

The multilayer films of the present invention can exhibit a free shrink (ASTM D 2732-83) at a temperature of 200° F. (93° C.). of preferably at least 8 percent, more preferably at least 9 percent, more preferably at least 10 percent, more preferably at least 11 percent, more preferably at least 13 percent, and most preferably at least 15 percent in either or both of the longitudinal and transverse directions, and preferably in both the longitudinal and transverse directions. Preferred ranges for free shrink at a temperature of 200° F. (93° C.). are between 8 percent and 50 percent, more preferably between 10 percent and 45 percent, more preferably between 15 percent and 40 percent in either or both of the longitudinal and transverse directions and preferably in both the longitudinal and transverse directions.

The multilayer films of the present invention can exhibit a composite free shrink at a temperature of 200° F. (93° C.) of preferably at least 16 percent, more preferably at least 18 percent, more preferably at least 20 percent, more preferably at least 25 percent, and most preferably at least 30 percent. Preferred ranges for composite free shrink at a temperature of 200° F. (93° C.) are between 16 percent and 100 percent, more preferably between 20 percent and 90 percent, more preferably between 25 percent and 75 percent, and most preferably between 30 percent and 70 percent.

The multilayer films of the present invention can exhibit a free shrink balance at a temperature of 240° F. (115° C.) of preferably less than or equal to 30 percent, ore preferably less than 20 percent, more preferably less than 15 percent, more preferably less than 10 percent, and most preferably less than 5 percent. Preferred ranges for free shrink balance at a temperature of 240° F. (115° C.). are between 0 percent and 30 percent, more preferably between 0 percent and 20 percent, more preferably between 0 percent and 15 percent, more preferably between 0 percent and 10 percent, and most preferably between 0 percent and 5 percent.

The multilayer film of the present invention can be stretch oriented at stretching ratios of preferably at least 1.5:1, more preferably at least 2:1, more preferably at least 2.5:1, more preferably at least 3:1, more preferably at least 3.25:1, more preferably at least 3.5:1, more preferably at least 4:1, more preferably at least 4.5:1, and most preferably at least 5:1 in either or both of the longitudinal and transverse directions and preferably in both the longitudinal and transverse directions. Preferred ranges for stretch orientation ratios are preferably between 1.5:1 and 8:1, more preferably between 3:1 and 7:1, and most preferably between 4:1 and 6:1 in either or both of the longitudinal and transverse directions, and preferably in both the longitudinal and transverse directions.

The multilayer film of the present invention can be crosslinked, by chemical means or, more preferably, by irradiation such as by electron beam irradiation at a dosage of between 10 and 200, more preferably between 15 and 150, more preferably between 20 and 150, and most preferably between 20 and 100 kiloGray. Although the invention does not have to be irradiated, in a preferred embodiment, irradiation can be used to improve impact strength. Preferably, the film has a substantially balanced free shrink. Preferably, at least 50 percent by volume of the total film volume comprises a multicomponent ethylene/alpha-olefin resin having a melt index less than 5 g/10 minutes.

In preferred resin compositions, the first component comprises 40 percent to 60 percent by weight of the resin, and the second component comprises 40 percent to 60 percent by weight of the resin. In more preferred resin compositions, the first (homogeneous) component comprises 45 percent to 55 percent by weight of the resin, and the second (heterogeneous) component comprises 45 percent to 55 percent by weight of the resin. In preferred resin compositions, the final ethylene polymer composition has a melt index about 45 times, or more, greater than the melt index of the homogeneous component.

It is to be understood that variations of the present invention can be made without departing from the scope of the invention, which is not limited to the specific embodiments and examples disclosed herein. All of the references including the United States patents cited herein are expressly incorporated herein by reference in their entireties.

EXAMPLE 1

Example 1 is an in-situ blend made according to U.S. Pat. No. 5,844,045 (Kolthammer et al.), U.S. Pat. No. 5,869,575 and U.S. Pat. No. 6,448,341, wherein the homogeneously branched polymer is made in a first reactor and is an ethylene homopolymer having a melt index ($I_2$) of about 0.02 g/10 min., and a density of greater than about 0.955 g/cm$^3$, and a molecular weight distribution (Mw/Mn) of about 2 and comprises about 45 percent by weight of the total composition. A heterogeneously branched ethylene homopolymer is made in a second reactor operated sequentially with the first reactor such that the final composition has a melt index ($I_2$) of about 0.9 g/10 min., and a density of greater than about 0.955 g/cm$^3$; the heterogeneous component comprises the remaining 55 percent by weight of the total composition. The resin was produced by reactor blending a narrow MWD fraction produced by a constrained geometry catalyst in the first reactor, using those catalysts as described in U.S. Pat. No. 5,965,756 and U.S. Pat. No. 6,034,022, and a broad MWD fraction produced by a standard Ziegler-Natta catalyst in a sequential second reactor, using those catalsysts as described in U.S. Pat. No. 3,257,332, U.S. Pat. No. 3,051,690, U.S. Pat. No. 4,314,912 (Lowery, Jr. et al.), U.S. Pat. No. 4,547,475 (Glass et al.), U.S. Pat. No. 4,612,300 (Coleman, III) and U.S. Pat. No. 4,659,685 (Coleman, III). The total composition has a melt index ($I_2$) of about 0.8-0.9 g/10 min, a density of about 0.96 g/cm$^3$, a melt flow ratio ($I_{10}/I_2$) of about 12 to 14. $I_{21}/I_2$ of less than about 70 and a molecular weight distribution [Mw/Mn)] of about 8.4, as described in Table 1.

The resin composition is fabricated into a three-layer (A/A/A) blown film with water vapor barrier properties as described in Table 2. The three layer film was fabricated on a co-extrusion blown film line consisting of two 2.5 inch, 24 L/D Egan extruders and a one 2 inch, 24 L/D Johnson extruder. The extruders are powdered by 60 (Extruder 1, outer layer), 75 (Extruder 2, core layer) and 20 (Extruder 3, inner layer) HP DC motors. Extruder 1 is equipped with a 2.88 compression ratio NewCastle single flight high shear screw with Twisted Egan Z Mixer. Extruder 2 is equipped with a 2.35 compression ratio DSB II barrier screw with Maddock Mixer. Extruder 3 is equipped with a 2.5 compression ratio Johnson single flight screw with Maddock Mixer. An 8 inch, Bottenfeld Gloucester 3 layer (32/36/32 layer ratio) die with internal bubble cooling and a 70 mil die pin was used. All the extruders are smooth bore with barrel heating and cooling. The pressure is monitored by pressure transducers on each extruder. An Extrol 6032 Microprocessor controls extrusion parameters such as rpm, % FLC (fill load capacity) horse power (HP), rate, lay flat width and melt temperature on each extruder.

The resin is further used as the water vapor barrier layer in a coextruded multilayer (A/A/A) blown film and the resultant film properties are reported in Table 3

TABLE 1

Resin Characteristics

| Resin | Example 1 (Component A + Component B) | Comparative Example 1 | Comparative Example 2 |
|---|---|---|---|
| Component A Density (g/cm$^3$) | >0.955 | — | — |
| Component A I$_2$ (g/10 min.) | About 0.02 | — | — |
| Weight Fraction of component A (percent) | 45 | — | — |
| Overall Density (g/cm$^3$) | 0.9606 | 0.9574 | 0.9632 |
| Overall I$_2$ (g/10 min.) | 0.85 | 0.80 | 0.70 |
| Overall I$_{10}$/I$_2$ | 13.1 | 14.5 | 16.3 |
| Overall I$_{21}$/I$_2$ | 66.4 | 63.7 | 76.9 |
| Mn | 12,410 | 17,980 | 13,140 |
| Mw | 104,550 | 134,260 | 113,680 |
| Mz (absolute) | 370,100 | 823,500 | 935,100 |
| Mw/Mn | 8.43 | 7.47 | 8.65 |
| Mz/Mw | 3.54 | 6.13 | 8.23 |
| Maximum Melt Strength cN (at 190° C.) | 4.5 | 5.5 | 9.5 |

TABLE 2

Trilayer Film Characteristics: Film Composition A/A/A, where A = Moisture Barrier Resin

| Resin | Blow Up Ratio (BUR)* | Extruder 1/2/3 Melt Temp (° F.) [° C.] | Extruder 1/2/3 Back Pressure (Adapter) (psi) [kPa] | Extruder 1/2/3 Horse Power (Amps) | Output Rate (lb/h) [kg/h] | WVTR (g-mil/(100 in$^2$ × day))** |
|---|---|---|---|---|---|---|
| Ex. 1 | 1.8 | 380/381/379 [193/194/193] | 1940/2280/1960 [1.34 × 10$^4$/1.57 × 10$^4$/ 1.35 × 10$^4$] | 11/6/5 | 229 [104] | 0.23 |
| Comp. Ex. 1 | 1.8 | 379/384/383 [193/196/195] | 2500/2390/2180 [1.72 × 10$^4$/1.65 × 10$^4$/ 1.50 × 10$^4$] | 14/8/5 | 230 [104] | 0.25 |
| Comp. Ex. 2 | 1.8 | 369/373/372 [187/189/189] | 2010/1920/1790 [1.39 × 10$^4$/1.32 × 10$^4$/ 1.23 × 10$^4$] | 12/7/5 | 233 [106] | 0.48 |

*BUR is the ratio of the bubble diameter to die diameter
**1 mil = 1/1000 inch = 25.4 micrometer Table 2 shows an improved resin processability and water vapor transmission performance balance for Example 1 as compared to the comparative examples.

TABLE 3

Multilayer Film Characteristics: Film Composition A/A/A where A = Moisture Barrier Resin

| Properties* | Ex. 1 | Comp. Ex. 1 |
|---|---|---|
| WVTR** at 1.25 mils (at 31.75 micrometer) | 0.14 | 0.17 |
| WVTR** at 1.75 mils (at 44.45 micrometer) | 0.11 | 0.10 |
| Secant Modulus (psi)/[kPa] 1.25 mils, MD | 155,000 [1.07 × 10$^6$] | 134,000 [9.24 × 10$^5$] |
| Secant Modulus (psi)/[kPa] 1.25 mils, CD | 172,000 [1.19 × 10$^6$] | 181,000 [1.25 × 10$^6$] |
| Secant Modulus (psi)/[kPa] 1.75 mils, MD | 145,000 [1.00 × 10$^6$] | 132,000 [9.1 × 10$^5$] |
| Secant Modulus (psi)/[kPa] 1.75 mils, CD | 164,000 [1.13 × 10$^6$] | 171,000 [1.18 × 10$^6$] |
| Instron siffness (g,) 1.25 mils MD | 3.6 | 2.7 |
| Instron stiffness (g) 1.25 mils CD | 4.2 | 3.9 |
| Instron stiffness (g) 1.75 mils, MD | 9.5 | 7.3 |
| Instron stiffness (g) 1.75 mils, CD | 10.4 | 10.7 |
| Extruder Back Pressure (psi)/[kPa] | 5500 [3.79 × 10$^4$] | 6300 [4.34 × 10$^4$] |

*All data at 2.4:1 BUR;
**g/100 inch$^2$/day

In general, films made from the novel formulated ethylene compositions exhibit good bubble stability during fabrication, and an especially good low water vapor transmission rate.

The water vapor transmission rate (WVTR) of HDPE film is strongly affected by the morphology of the crystalline fraction. We found that high molecular weight (MW) fraction, even when present at low concentration, can induce a shish-kabob crystalline morphology that is detrimental to WVTR performance. Thus, a narrow molecular weight distribution (MWD) is preferred to prevent the occurrence of the undesirable shish-kabob morphology by eliminating the high molecular weight component. Also, one skilled in the art would know that long chain branching (LCB) would be undesirable, since chain entanglements would retard relaxation of the branched molecules. On the other hand, in order to obtain good resin processability, broad MWD and presence of LCB are desirable.

In this invention, contrary to the current understanding of the MWD-LCB-WVTR relationship, we have discovered that broad MWD resins with good WVTR performance can be made. This was achieved by utilizing a single site-metallocene catalyst, a bimodal MWD, and elimination of high molecular weight fractions. Surprisingly, the LCB from a single-site constrained geometry catalyst does not cause the undesired shish kabob morphology. Thus, a bimodal single site constrained geometry-based HDPE molecular architecture provides improved processability and at the same time provides a better barrier to water vapor transmission. HDPE film with good water vapor barrier properties finds application in dry food packaging as they increase the food shelf life.

The invention claimed is:
1. An ethylene homopolymer or interpolymer composition having a percentage fraction of a GPC-LS chromatogram which has a molecular weight equal to or greater than 1,000,

000 as determined by gel permeation chromatography with a low angle laser light scattering detector is at least 2.5 percent but no more than about 20 percent of the total area of the GPC-LS chromatogram; and having a percentage fraction of a GPC-RI chromatogram which has a molecular weight equal to or less than about 10,000 as determined by gel permeation chromatography with a differential refractometer is no more than about 25 percent but at least about 10 percent of the total area of the GPC-RI chromatogram.

2. The ethylene composition of claim 1 wherein the percentage fraction of the GPC-LS chromatogram which has a molecular weight equal to or greater than 1,000,000 as determined by gel permeation chromatography with a low angle laser light scattering detector is equal to or less than about 15 percent of the total area of the GPC-LS chromatogram, and wherein the percentage fraction of a GPC-RI chromatogram which has a molecular weight equal to or less than about 10,000 as determined by gel permeation chromatography with a differential refractometer is equal to or greater than about 15 percent of the total area of the GPC-RI chromatogram.

3. The ethylene composition of claim 1, wherein the percentage fraction of the GPC-LS chromatogram which has a molecular weight equal to or greater than 1,000,000 as determined by gel permeation chromatography with a low angle laser light scattering detector is equal to or less than about 10 percent of the total area of the GPC-LS chromatogram, and wherein the percentage fraction of the GPC-RI chromatogram which has a molecular weight equal to or less than about 10,000 as determined by gel permeation chromatography with a differential refractometer is equal to or greater than about 20 percent of the total area of the GPC-RI chromatogram.

4. The ethylene composition of claim 1, wherein the percentage fraction of the GPC-RI chromatogram which has a molecular weight equal to or less than about 10,000 as determined by gel permeation chromatography with a differential refractometer is equal to or greater than about 15 percent of the total area of the GPC-RI chromatogram.

5. The ethylene composition of claim 1, wherein the percentage fraction of the GPC-RI chromatogram which has a molecular weight equal to or less than about 10,000 as determined by gel permeation chromatography with a differential refractometer is equal to or greater than about 20 percent of the total area of the GPC-RI chromatogram.

6. The ethylene composition of claim 1, wherein the percentage fraction of the GPC-LS chromatogram which has a molecular weight equal to or greater than 1,000,000 as determined by gel permeation chromatography with a low angle laser light scattering detector is equal to or less than about 15 percent of the total area of the GPC-LS chromatogram.

7. The ethylene composition of claim 2, wherein the percentage fraction of the GPC-RI chromatogram which has a molecular weight equal to or less than about 10,000 as determined by gel permeation chromatography with a differential refractometer is equal to or greater than about 20 percent of the total area of the GPC-RI chromatogram.

8. The ethylene composition of claim 1, wherein the percentage fraction of the GPC-LS chromatogram which has a molecular weight equal to or greater than 1,000,000 as determined by gel permeation chromatography with a low angle laser light scattering detector is equal to or less than about 10 percent of the total area of the GPC-LS chromatogram.

9. The ethylene composition of claim 8, wherein the percentage fraction of the GPC-RI chromatogram which has a molecular weight equal to or less than about 10,000 as determined by gel permeation chromatography with a differential refractometer is equal to or greater than about 15 percent of the total area of the GPC-RI chromatogram.

10. A film comprising at least one layer made from the polymer composition of any one of the preceding claims 1, or 2 to 9.

* * * * *